United States Patent
Kim et al.

(10) Patent No.: US 9,807,677 B2
(45) Date of Patent: Oct. 31, 2017

(54) SERVICE DISCOVERY METHOD AND DEVICE IN WIRELESS LAN SYSTEM

(71) Applicant: LG ELECTRONICS INC., Seoul (KR)

(72) Inventors: Suhwook Kim, Anyang-si (KR); Byungjoo Lee, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 220 days.

(21) Appl. No.: 14/652,748

(22) PCT Filed: Dec. 17, 2013

(86) PCT No.: PCT/KR2013/011708
§ 371 (c)(1),
(2) Date: Jun. 16, 2015

(87) PCT Pub. No.: WO2014/098437
PCT Pub. Date: Jun. 26, 2014

(65) Prior Publication Data
US 2015/0334638 A1 Nov. 19, 2015

Related U.S. Application Data

(60) Provisional application No. 61/738,346, filed on Dec. 17, 2012.

(51) Int. Cl.
*H04W 48/14* (2009.01)
*H04W 8/18* (2009.01)
(Continued)

(52) U.S. Cl.
CPC ......... *H04W 48/14* (2013.01); *H04L 67/1061* (2013.01); *H04L 67/16* (2013.01);
(Continued)

(58) Field of Classification Search
CPC combination set(s) only.
See application file for complete search history.

(56) References Cited

U.S. PATENT DOCUMENTS 6,292,483 B1 * 9/2001 Kerstein ............ G06F 13/1605
370/389
6,681,258 B1 * 1/2004 Ratcliff ............ H04L 29/12009
709/230

(Continued)

FOREIGN PATENT DOCUMENTS

KR    10-2012-0045628    5/2012
WO    2011/082689    7/2011

(Continued)

OTHER PUBLICATIONS

Kovacevic et al, NanoSD: A Flexible Service Discovery Protocol for Dynamic and Heterogeneous Wireless Sensor Networks, Dec. 20-22, 2010, IEEE, 6 pages.*

(Continued)

*Primary Examiner* — Mounir Moutaouakil
(74) *Attorney, Agent, or Firm* — Lee, Hong, Degerman, Kang & Waimey

(57) ABSTRACT

The present invention relates to a wireless communication system, and more particularly, to a service discovery method and device in a wireless LAN system. A service discovery method in a wireless LAN system according to one embodiment of the present invention can comprise: transmitting, by a request device, a service discovery request frame to a response device; and receiving, by the request device, a service discovery response frame, which comprises service information of the response device and service information of each of one or more other devices, from the response device. The one or more other devices can comprise a device which does not belong to the same group as the response device.

18 Claims, 10 Drawing Sheets

(51) Int. Cl.
*H04L 29/08* (2006.01)
*H04W 84/12* (2009.01)
*H04W 48/16* (2009.01)

(52) U.S. Cl.
CPC ............ *H04W 8/186* (2013.01); *H04W 48/16* (2013.01); *H04W 84/12* (2013.01)

(56) References Cited

U.S. PATENT DOCUMENTS

| | | | | |
|---|---|---|---|---|
| 6,711,165 | B1* | 3/2004 | Tzeng | H04L 47/2425 370/392 |
| 7,768,982 | B2* | 8/2010 | Zhang | H04W 48/16 370/252 |
| 7,860,019 | B2* | 12/2010 | Zhang | H04L 67/104 370/252 |
| 8,170,481 | B2* | 5/2012 | Rangarajan | H04L 67/16 370/349 |
| 9,002,352 | B2* | 4/2015 | Abraham | H04W 48/16 455/434 |
| 9,059,923 | B2* | 6/2015 | Abraham | H04W 40/246 |
| 9,356,974 | B2* | 5/2016 | Nagawade | H04W 8/005 |
| 9,398,172 | B2* | 7/2016 | Mohammed | H04W 24/08 |
| 2007/0171881 | A1* | 7/2007 | Zhang | H04W 48/16 370/338 |
| 2007/0243888 | A1* | 10/2007 | Faccin | H04W 48/14 455/461 |
| 2009/0245133 | A1* | 10/2009 | Gupta | H04W 48/14 370/254 |
| 2010/0322213 | A1* | 12/2010 | Liu | H04L 67/16 370/338 |
| 2011/0080896 | A1 | 4/2011 | Krishnamurthy et al. | |
| 2011/0149806 | A1* | 6/2011 | Verma | H04L 12/2809 370/255 |
| 2011/0286376 | A1 | 11/2011 | Yoo et al. | |
| 2012/0020220 | A1* | 1/2012 | Sugita | H04L 63/02 370/235 |
| 2012/0106364 | A1* | 5/2012 | Kasslin | H04W 16/14 370/252 |
| 2012/0243524 | A1* | 9/2012 | Verma | H04W 48/16 370/338 |
| 2013/0217359 | A1* | 8/2013 | Cherian | G06F 15/177 455/411 |
| 2013/0231151 | A1* | 9/2013 | Kneckt | H04W 40/246 455/515 |
| 2013/0316705 | A1* | 11/2013 | Kneckt | H04L 67/16 455/435.1 |
| 2014/0156948 | A1* | 6/2014 | Roberts | G06F 12/0895 711/143 |
| 2014/0177618 | A1* | 6/2014 | Shen | H04W 76/02 370/338 |
| 2014/0370913 | A1* | 12/2014 | Chang | H04W 24/10 455/456.1 |
| 2015/0117430 | A1* | 4/2015 | Zhuang | H04L 67/16 370/338 |
| 2016/0072678 | A1* | 3/2016 | Dong | H04L 67/16 370/254 |

FOREIGN PATENT DOCUMENTS

| | | |
|---|---|---|
| WO | 2012/096546 | 7/2012 |
| WO | 2012/115385 | 8/2012 |
| WO | 2012/130173 | 10/2012 |
| WO | 2012/134245 | 10/2012 |

OTHER PUBLICATIONS

Shelby et al, Constrained Application Protocol (CoAP), Jan. 9, 2011, Internet-Draft, 34 pages.*

Beatty et al, Web Services Dynamic Discovery (WSDiscovery), Apr. 2005, 42 pages.*

PCT International Application No. PCT/KR2014/000746, Written Opinion of the International Searching Authority dated Apr. 29, 2014, 1 page.

PCT International Application No. PCT/KR2013/011708, Written Opinion of the International Searching Authority dated Apr. 24, 2014, 17 pages.

* cited by examiner

FIG. 9

| Info ID | Length | OI | Vendor Specific Content |
|---------|--------|-----|------------------------|

Octets :      2      2      variable      variable

FIG. 10

| ANQP Query Request Vendor - specific Content |||||||
|---|---|---|---|---|---|
| OUI subtype | Service Update Indicator | ANQP Query Request Vendor - specific Content TLV ||||
| | | Length | Service Protocol Type | Service Transaction ID | Query Data |
| 1 octet | 2 octets | 2 octets | 1 octet | 1 octet | Variable |

FIG. 11

| ANQP Query Response Vendor - specific Content |||||||
|---|---|---|---|---|---|---|
| OUI subtype | Service Update Indicator | ANQP Query Response Vendor - specific Content TLV |||||
| | | Length | Service Protocol Type | Service Transaction ID | Status code | Resoponse Data Group |
| 1 octet | 2 octets | 2 octets | 1 octet | 1 octet | 1 octet | Variable |

FIG. 12

| | Device ID |||| Response Data |
|---|---|---|---|---|---|
| Subfield name | Attribute ID | Length | device address | | Response Data |
| Length (octet) | 1 | 2 | 6 | | variable |
| Value (example) | 3 | 6 | 00:02:2A:C1:F5:C9 | | Information of Wi-Fi Display |

FIG. 13

| | Device 2 | | | | Device 3 | | | | Device 4 | | | | Device 5 | | | |
|---|---|---|---|---|---|---|---|---|---|---|---|---|---|---|---|---|
| | Attribute ID | Device ID | | Response Data | Attribute ID | Device ID | | Response Data | Attribute ID | Device ID | | Response Data | Attribute ID | Device ID | | Response Data |
| Subfield name | Attribute ID | Length | device address | Response Data | Attribute ID | Length | device address | Response Data | Attribute ID | Length | device address | Response Data | Attribute ID | Length | device address | Response Data |
| Length (octet) | 1 | 2 | 6 | variable | 1 | 2 | 6 | variable | 1 | 2 | 6 | variable | 1 | 2 | 6 | variable |
| Value (example) | 3 | 6 | - | N/A | 3 | 6 | - | N/A | 3 | 6 | - | N/A | 3 | 6 | - | N/A |

SERVICE DISCOVERY METHOD AND DEVICE IN WIRELESS LAN SYSTEM

CROSS-REFERENCE TO RELATED APPLICATIONS

This application is the National Stage filing under 35 U.S.C. 371 of International Application No. PCT/KR2013/011708, filed on Dec. 17, 2013, which claims the benefit of U.S. Provisional Application No. 61/738,346, filed on Dec. 17, 2012, the contents of which are all hereby incorporated by reference herein in their entirety.

TECHNICAL FIELD

Following description relates to a wireless communication system, and more particularly, to a service discovery method in a wireless LAN system and an apparatus therefor.

BACKGROUND ART

Recently, with the development of information communication technology, various wireless communication technologies have been developed. Of the technologies, wireless LAN (WLAN) is the technology that allows home or company or a specific service zone to access Internet wirelessly by using a portable terminal such as a personal digital assistant (PDA), a lap top computer, a portable multimedia player (PMP).

As direct communication technology that may allow devices to be easily connected with each other without a radio access point (AP) basically required in a conventional WLAN system, the introduction of Wi-Fi Direct or Wi-Fi peer-to-peer (P2P) has been discussed. According to Wi-Fi Direct, devices may be connected to each other even without a complicated establishment procedure. Also, Wi-Fi Direct may support a mutual operation for data transmission and reception at a communication speed of a general WLAN system to provide users with various services.

Recently, various Wi-Fi support devices have been used. Of the Wi-Fi support devices, the number of Wi-Fi Direct support devices that enable communication between Wi-Fi devices without AP has been increased. In Wi-Fi Alliance (WFA), technology for the introduction of a platform for supporting various services (for example, Send, Play, Display, Print, etc.) using Wi-Fi Direct link has been discussed. This may be referred to as Wi-Fi Direct Service (WFDS). According to the WFDS, applications, services, etc. may be controlled or managed by a service platform called an application service platform (ASP).

DISCLOSURE OF THE INVENTION

Technical Task

An object of the present invention is to provide a method of improving a service discovery process, which is performed to identify a device supporting a preferred service before being connected to a network.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing a service discovery process in a wireless LAN system can include the steps of transmitting a service discovery request frame, which is transmitted by a requesting device, to a responding device and receiving a service discovery response frame including service information of the responding device and service information of each of one or more different devices, which is received by the requesting device, from the responding device. In this case, the one or more different devices can include a device not belongs to a group to which the responding device belongs thereto.

To further achieve these and other advantages and in accordance with the purpose of the present invention, according to a different embodiment, a method of performing a service discovery process in a wireless LAN system can include the steps of receiving a service discovery request frame, which is received by a responding device, from a requesting device and transmitting a service discovery response frame including service information of the responding device and service information of each of one or more different devices, which is transmitted by the responding device, to the requesting device. In this case, the one or more different devices can include a device not belongs to a group to which the responding device belongs thereto.

To further achieve these and other advantages and in accordance with the purpose of the present invention, according to a further different embodiment, a requesting device performing a service discovery process in a wireless LAN system can include a transceiver and a processor, the processor configured to transmit a service discovery request frame to a responding device using the transceiver, the processor configured to receive a service discovery response frame including service information of the responding device and service information of each of one or more different devices from the responding device using the transceiver. In this case, the one or more different devices can include a device not belongs to a group to which the responding device belongs thereto.

To further achieve these and other advantages and in accordance with the purpose of the present invention, according to a further different embodiment, a responding device performing a service discovery process in a wireless LAN system can include a transceiver and a processor, the processor configured to receive a service discovery request frame from a requesting device using the transceiver, the processor configured to transmit a service discovery response frame including service information of the responding device and service information of each of one or more different devices to the requesting device using the transceiver. In this case, the one or more different devices can include a device not belongs to a group to which the responding device belongs thereto.

In the aforementioned embodiments according to the present invention, following items can be commonly applied.

The responding device may correspond to a device selected via a device discovery process performed by the requesting device.

The responding device may correspond to a device having capability for caching the service information of each of the one or more different devices.

Information indicating the capability of the responding device can be included in at least one selected from the group consisting of a beacon frame, a probe response frame, an associated frame and a re-associated frame transmitted by the responding device.

Information indicating the capability of the responding device can be configured by a bitmap including a bit indicating whether the responding device supports a cached service discovery.

The service discovery request frame can include information indicating whether a cached service discovery is requested to indicate whether the service information for the responding device is requested only or whether the service information for the responding device and the service information for the one or more different devices are requested.

The information indicating whether the cached service discovery is requested can be indicated using a specific bit of a service protocol type field of the service discovery request frame.

The service discovery response frame can further include device identification information on each of the responding device and the one or more different devices.

If there exist a plurality of service types supported by the responding device and the one or more different devices, the service discovery response frame can include device identification information capable of being supported according to a service type and service information.

The service discovery process can be performed before the requesting device is connected to a network.

The group may correspond to a Wi-Fi direct group.

It is to be understood that both the foregoing general description and the following detailed description are exemplary and explanatory and are intended to provide further explanation of the invention as claimed.

Advantageous Effects

According to the present invention, it is able to provide a method of improving a service discovery process, which is performed to identify a device supporting a preferred service before being connected to a network, and an apparatus therefor.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a diagram for an exemplary format of ANQP vendor-specific element according to one example of the present invention;

FIG. 10 is a diagram for an exemplary format of ANQP query request vendor-specific content according to one example of the present invention;

FIG. 11 is a diagram for an exemplary format of ANQP query response vendor-specific content according to one example of the present invention;

FIG. 12 is a diagram for an exemplary format of a response data group field according to one example of the present invention;

FIG. 13 is a diagram for a different exemplary format of a response data group field according to one example of the present invention;

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting unclear, structures and/or devices known to the public are skipped or can be represented as block diagrams centering on the core functions of the structures and/or devices. Wherever possible, the same reference numbers will be used throughout the drawings to refer to the same or like parts.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns IEEE 802.11 system, by which the technical features of the present invention may be non-limited.

Structure of WLAN System

Figure 1:
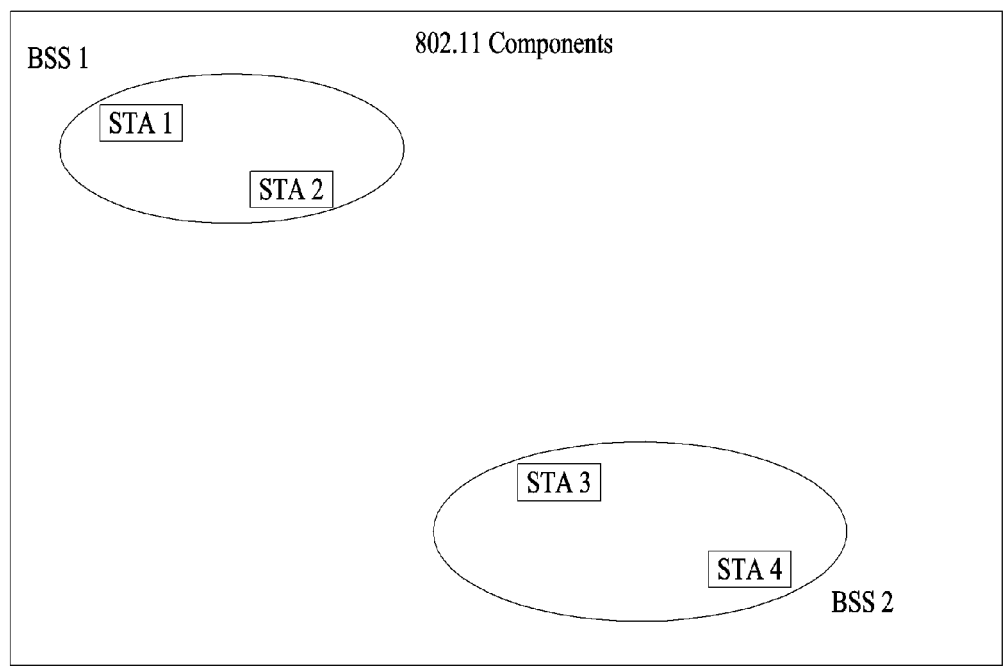
FIG. 1 is a diagram illustrating an exemplary structure of an IEEE 802.11 system to which the present invention may be applied.

FIG. 1 is a diagram for one example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communications. This area may be named a basic service area (BSA). Once the STA moves away from the BSA, it is unable to directly communicate with other STAs within the corresponding BSA.

A BSS of a most basic type in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. The above-configured WLAN is not configured by being designed in advance but can be configured under the necessity of WLAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. This association may be dynamically configured or may include a use of a DSS (distribution system service).

Additionally, FIG. 1 shows such a configuration element as a DS (distribution system), a DSM (distribution system medium), an AP (access point) and the like.

In WLAN, a direct station-to-station distance can be restricted by PHY capability. In some cases, the restriction of the distance may be sufficient enough. Yet, in some cases, it may be necessary to perform communication between stations of longer distance. In order to support extended coverage, it may be able to configure a DS (distribution system).

A DS indicates a structure of BSSs interconnected with each other. Specifically, as shown in FIG. 1, a BSS may exist as a configuration element of an extended form of a network consisting of a plurality of BSSs instead of an independently existing BSS.

A DS corresponds to a logical concept and can be specified by a characteristic of a DSM (distribution system medium). Regarding this, IEEE 802.11 standard logically distinguishes a WM (wireless medium) from the DSM (distribution system medium). Each logical medium is used for a purpose different from each other and is used by a configuration element different from each other. Definition of the IEEE 802.11 standard does not restrict the media to be identical to each other and does not restrict the media to be different from each other. Since a plurality of the media are logically different from each other, it may be able to explain as IEEE 802.11 WLAN structure (a DS structure or a different network structure) is flexible. In particular, the IEEE 802.11 WLAN structure can be implemented in various ways and the WLAN structure can be independently specified by a physical characteristic of each implementation case.

A DS provides seamless integration of a plurality of BSSs and logical services necessary for handling an address to a destination to support a mobile device.

An AP enables associated STAs to access a DS via a WM. The AP corresponds to an entity having STA functionality. Data can move between a BSS and a DS via the AP. For instance, as shown in FIG. 1, while an STA 2 and an STA 3 have STA functionality, the STA 2 and the STA 3 provide a function for enabling associated STAs (STA 1 and STA 4) to access the DS. And, since all APs basically correspond to an STA, all APs correspond to an addressable entity. It is not mandatory that an address used by the AP for communication in WM is identical to an address used by the AP for communication in DSM.

Data transmitted from one of STAs associated with an AP to an STA address of the AP is always received in an uncontrolled port and the data can be processed by IEEE 802.1X port access entity. If a controlled port is authenticated, a transmission data (or a frame) can be delivered to a DS.

Layer Structure

The operation of the STA which is operated in the wireless LAN system may be described in view of layer structure. In aspect of device configuration, layer structure may be implemented by a processor. The STA may have a structure of a plurality of layers. For example, a layer structure handled by the 802.11 standard document mainly includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptionally include management entities called MAC sublayer management entity (MLME) and physical layer management entity (PLME), respectively. These entities provide a layer management service interface that operates a layer management function.

In order to provide exact MAC operation, an SME (Station Management Entity) is present within each STA. The SME is a layer independent entity that may be viewed as residing in a separate management plane or as residing "off to the side." The exact functions of the SME are not specified in this document, but in general this entity may be viewed as being responsible for such functions as the gathering of layer-dependent status from the various layer management entities (LMEs), and similarly setting the value of layer-specific parameters. The SME may perform such functions on behalf of general system management entities and may implement standard management protocols.

The aforementioned entities interact in various ways. For example, the entities may interact by exchanging GET/SET primitives. The primitive means a set of elements or parameters related to a specific object. XX-GET.request primitive is used for requesting the value of the given MIB attribute (management information base attribute). XX-GET.confirm primitive is used for returning the appropriate MIB attribute value if status is "success," otherwise returning an error indication in the Status field. XX-SET.request primitive is used for requesting that the indicated MIB attribute be set to the given value. If this MIB attribute implies a specific action, this requests that the action be performed. And, XX-SET.confirm primitive is used such that, if status is "success," this confirms that the indicated MIB attribute has been set to the requested value, otherwise it returns an error condition in the status field. If this MIB attribute implies a specific action, this confirms that the action has been performed.

Also, the MLME and the SME may exchange various MLME_GET/SET primitives through MLME SAP (Service Access Point). Also, various PLME_GET/SET primitives may be exchanged between PLME and SME through PLME_SAP, and may be exchanged between the MLME and PLME through MLME-PLME_SAP.

Wi-Fi Direct Network

A legacy wireless LAN mainly handles operations of an infrastructure BSS where a wireless access point (AP) functions as a hub. The AP is in charge of a function of supporting a physical layer for wireless/wired connection, routing function for devices on a network, a function of providing a service for adding/eliminating a device to/from the network and the like. In this case, devices in the network are connected with each other via the AP instead of being directly connected with each other.

As a technology of supporting direct link between devices, legislation of Wi-Fi direct standard is discussing.

Figure 2:
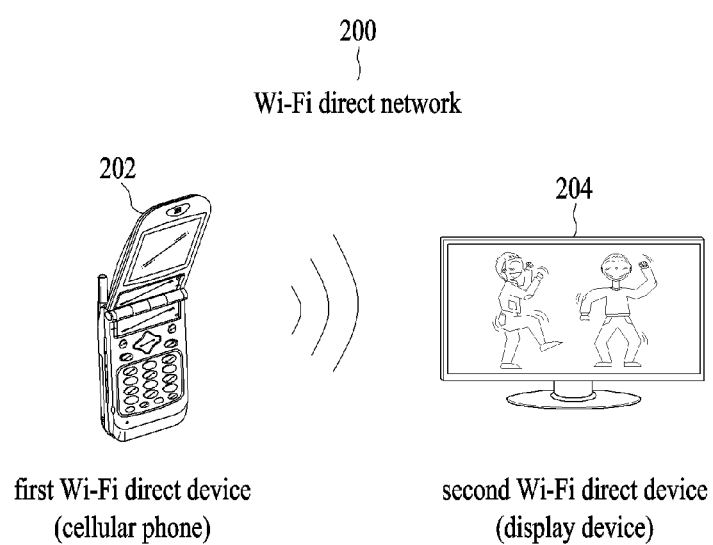
FIG. 2 is a diagram illustrating a WFD (Wi-Fi Direct) network.

FIG. 2 is a diagram illustrating a WFD (Wi-Fi Direct) network. The Wi-Fi direct network is also called a Wi-Fi direct group or a P2P group.

The Wi-Fi direct network corresponds to a network that Wi-Fi devices are capable of performing D2D (device-to-device) (or P2P (peer-to-peer)) communication with each other although the Wi-Fi devices do not participate in a home network, an office network and a hotspot network. The Wi-Fi direct network is proposed by Wi-Fi alliance. Wi-Fi direct-based communication can be called Wi-Fi direct D2D communication (simply, D2D communication) or Wi-Fi direct P2P communication (simply, P2P communication). And, a device performing the Wi-Fi direct P2P communication can be called a Wi-Fi direct P2P device, simply, a P2P device.

Referring to FIG. 2, a Wi-Fi direct network 200 can include at least one or more Wi-Fi devices including a first Wi-Fi direct device 202 and a second Wi-Fi direct device 204. A Wi-Fi direct device includes such devices supporting Wi-Fi as a display device, a printer, a digital camera, a projector, a smartphone and the like. And, the Wi-Fi direct device includes a non-AP STA and an AP STA. In an example shown in FIG. 2, the first Wi-Fi direct device 202 corresponds to a cellular phone and the second Wi-Fi direct device 204 corresponds to a display device. Wi-Fi devices in a Wi-Fi direct network can be directly connected with each other. Specifically, P2P communication may correspond to a case that a signal transmission path between two Wi-Fi direct devices is directly configured between the Wi-Fi direct devices without passing through a third device (e.g., an AP) or a legacy network (e.g., access WLAN via an AP). In this case, the signal transmission path directly configured between the two Wi-Fi direct devices can be restricted to a data transmission path. For instance, the P2P communication may correspond to a case that a plurality of non-STAs transmit a data (e.g., audio/video/text information and the like) without passing through an AP. A signal transmission path for control information (e.g., resource allocation information for P2P configuration, wireless device identification information and the like) is directly configured between WFD devices (e.g., non-AP STA-to-non-AP STA, non-AP STA-to-AP), is configured between two Wi-Fi direct devices (e.g., non-AP STA-to-non-AP STA) via the AP, or can be configured between the AP and a corresponding Wi-Fi direct device (e.g., AP-to-non-AP STA #1, AP-to-non-AP STA #2).

In order to efficiently use devices supporting Wi-Fi direct after the devices are connected with each other, the devices should be connected with each other based on a service supported by an application layer of each device. For instance, when a user intends to output a picture stored in a smartphone of the user, according to a legacy scheme, a printer and the smartphone should be connected with each other in a local network, the printer is searched and selected by an input of the user, and the picture is transmitted to the printer. Yet, if the printer does not exist in the network, the user wastes time for network connection. In particular, since the user is unable to know whether there exists an entity capable of providing a print service in the network until the entity is connected to the network, the aforementioned inefficient process occurs. If a service discovery is possible before the entity is connected to the network, the aforementioned problem can be avoided. Hence, it is required to efficiently design a service discovery process performing discovery and notification on a higher layer service included (or supported) in/by a Wi-Fi device before the Wi-Fi device is connected to the network.

Figure 3:
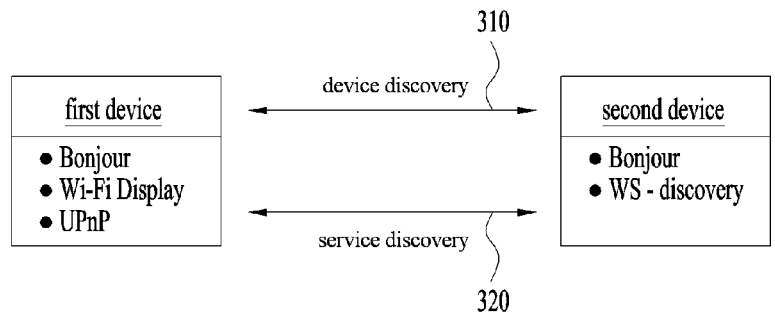
FIG. 3 is a flowchart for explaining a device discovery process and a service discovery process.

FIG. 3 is a flowchart for explaining a device discovery process and a service discovery process.

FIG. 3 shows a first device, a second device and service/protocol supported by each of the first and the second device. In an example shown in FIG. 3 assume that the first device supports Bonjour, Wi-Fi display and UPnP (universal plug and play) and the second device supports Bonjour and WS (web service) dynamic discovery.

In the example of FIG. 3, the first device can perform a device discovery process 301 to recognize each other before being connected with the second device via Wi-Fi direct network. The first device can perform a service discovery process 302 for a device discovered via the device discovery process 301. By doing so, the first device becomes aware of service information provided by a counterpart device. Hence, it is able to identify a service provided by a counterpart device before a Wi-Fi direct network session is established between the first and the second device.

Specifically, it may be able to use a probe request frame and a probe response frame to exchange device information with each other in the device discovery process 301. In order to explore whether there exists a different device near the first device, the first device can transmit a probe request frame on an available radio channel. If the second device receives the probe request frame, the second device can transmit a probe response frame to the first device in response to the probe request frame.

It may be able to use a service discovery request frame and a service discovery response frame to exchange service information with each other in the service discovery process 302. Exchange of the service discovery request frame and the service discovery response frame can be performed using a GAS (generic advertisement service) protocol defined by IEEE 802.11u.

If the device discovery process 301 and the service discovery process 302 shown in FIG. 3 are successfully completed, a P2P link configuration and a communication process can be performed between the corresponding devices.

Figure 4:
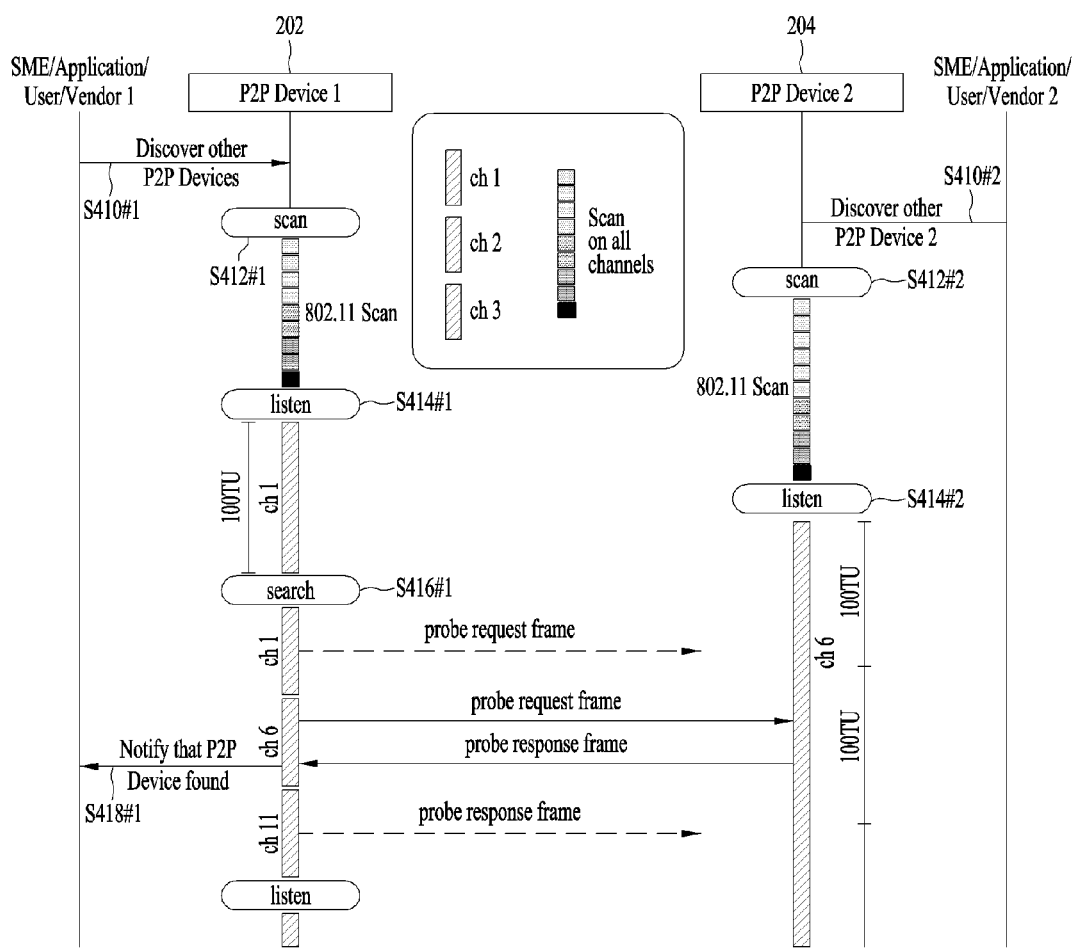
FIG. 4 is a flowchart for explaining a device discovery process in more detail.

FIG. 4 is a flowchart for explaining a device discovery process in more detail.

Referring to FIG. 4, the device discovery process 301 of FIG. 3 can be initiated by an indication of an SME (station management entity)/application/user/vendor [S410] and the device discovery process can be divided into a scan phase [S412] and a find phase [S414 to S416]. The scan phase [S412] includes an operation of scanning all available radio channels according to 802.11 scheme. in doing so, a P2P device can check a best operation channel. The find phase [S414 to S416] includes a listen mode [S414] and a search mode [S416] and the P2P device alternately repeats the listen mode [S414] and the search mode [S416]. The P2P device 202/204 performs an active search using a probe request frame in the search mode [S416] and may be able to restrict a search range to such a social channel as a channel 1, 6 and 11 (e.g., center frequency 2412, 2437 and 2462 MHz) for a quick search. The P2P device 202/204 selects one channel only among the 3 social channels in the listen mode [S414] and maintains a reception status. In this case, if a probe request frame, which is transmitted by a different P2P device (e.g., 202) in the search mode, is received, the P2P device (e.g., 204) transmits a probe response frame in response to the probe request frame. Time of the listen mode [S414] can be randomly given (e.g., 100, 200 and 300 TU (time unit)). The P2P devices continuously repeat the search mode and the reception mode and may be able to arrive at a channel common to the P2P devices. After a P2P device discovers a different P2P device, the P2P device can discover/exchange a device type, a manufacturer, and a friendly device name using a probe request frame and a probe response frame to selectively combine with the different P2P device. If a neighboring P2P device is discovered and necessary information is obtained via a neighbor discovery process, a P2P device (e.g., 202) can inform an SME/application/user/vender of the discovery of the P2P device [S418].

It may be able to determine a device supporting a service preferred by a user via the device discovery process and the service discovery process.

In case of directly connecting devices with each other, a user may physically check a device providing a service preferred by the user and attempt to connect to the device. Yet, if a user is unable to know whether devices near the user support Wi-Fi, it is required to have a process of attempting to connect with all devices one by one and a process of checking whether the service preferred by the user is supported by a corresponding device. And, if there exist a plurality of devices providing a same service near a user, it is difficult for a user to compare and select a device appropriated for the user among a plurality of the devices.

Hence, it is required to have a method of enabling a user to check whether there exists a device providing a service preferred by the user before the device is directly connected or being connected to a network. To this end, it may be able to use a GAS protocol defined by IEEE 802.11u. In particular, in case of Wi-Fi direct, a service discovery process can be performed using the GAS protocol. Yet, the service discovery process is performed using one-to-one request/response scheme between two devices and service-related information can be exchanged only between the two devices. If there exist a plurality of devices, since a service discovery process should be performed in each of a plurality of the devices, considerable amount of time is consumed for the service discovery process. Hence, it is required to have a method of improving the aforementioned problem.

Figure 5:
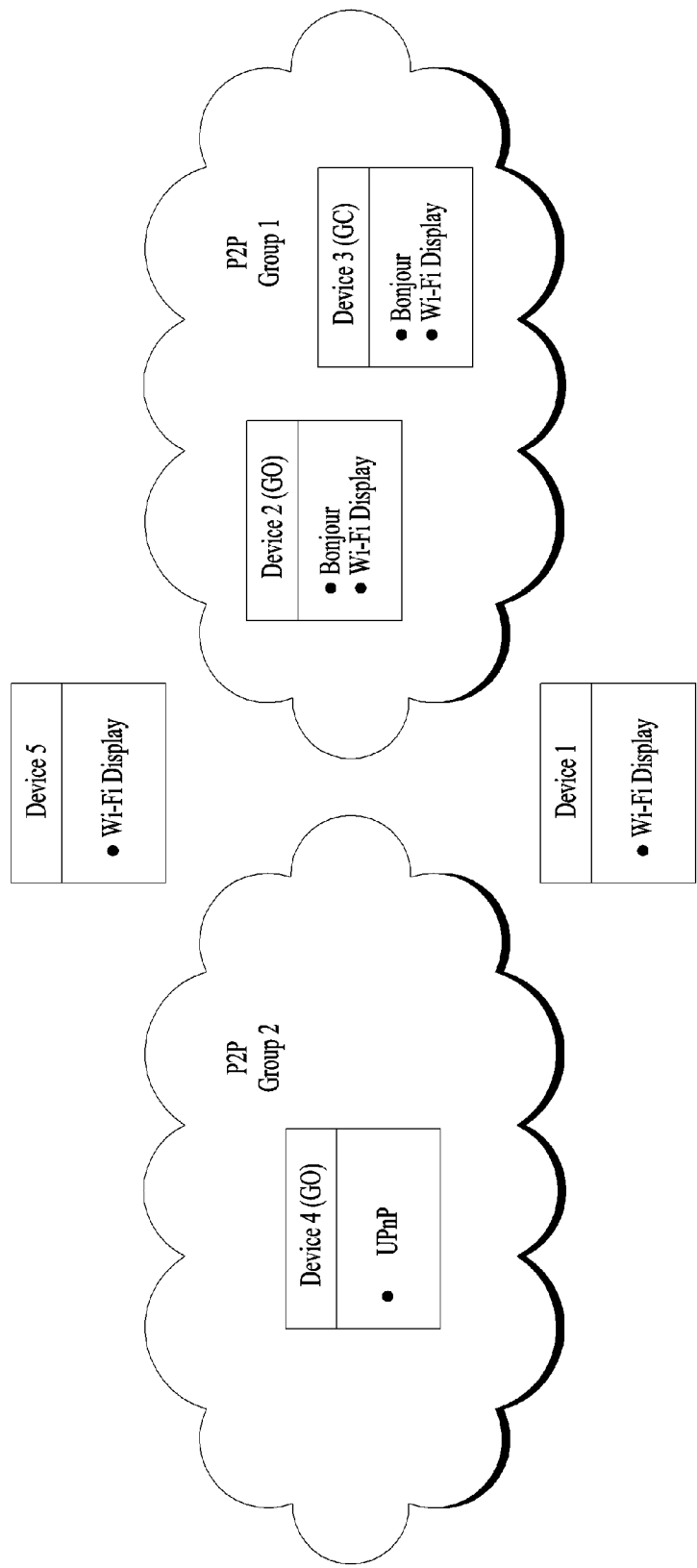
FIG. 5 is a diagram for explaining an example of network environment to which examples of the present invention are applicable.

FIG. 5 is a diagram for explaining an example of network environment to which examples of the present invention are applicable.

Before the example of FIG. 5 is explained, a Wi-Fi direct group is briefly explained.

In a Wi-Fi direct group, a GO (group owner) may play a role of an access point in an infrastructure mode and other devices can join the group as a GC (group client). A group can be generated while a group owner device is determined by negotiation between two devices or can be generated in an autonomous mode by a single group owner device. Among the two devices belonging to the group, a group owner is determined by contention based on a group owner intention value of each device. One device of a higher group owner intention value becomes the group owner and another device becomes a group client. In case of the autonomous mode, a device, which has generated a group, becomes the group owner. A Wi-Fi direct device can join a group in a manner of establishing association with a group owner of the previously existing group.

In the example of FIG. 5, assume a situation that a device 1 newly approaches and intends to search for a list of services capable of being supported by neighboring devices and functions in a situation that 4 P2P devices (a device 2, a device 3, a device 4 and a device 5) are located within a short distance. And, FIG. 5 shows that the device 2 and the device 3 form a P2P group (a P2P group 1 in FIG. 3), the device 2 operates as a group owner and the device 3 operates as a group client. And, although the device 4 operates as a GO of a P2P group 2, there is no GC belonging to the P2P group 2. And, the device 5 is currently connected with no device (i.e., the device 5 does not belong to any P2P).

In this case, assume that a service capable of being supported by each device is different from each other. Referring to the example of FIG. 5, for instance, the device 1 can support Wi-Fi display, the device 2 and the device 3 can support Bonjour and Wi-Fi display, the device 4 can support Wi-Fi display UPnP and the device 5 can support Wi-Fi display.

In order for the device 1 to identify services capable of being supported by neighboring devices, the device 1 can basically perform a service discovery process with each of the device 2 to the device 5 by one-to-one.

If a group owner knows a type of a service supported by a device(s) (or a group client(s)) belonging to a group and related capability in advance, the group owner can inform service-related information (e.g., a service list capable of being provided by all devices belonging to the group) of many devices of a device requesting a service discovery in the service discovery process. In the example of FIG. 5, the device 1 performs the service discovery process with a device(s) corresponding to a group owner only and the group owner (e.g., the device 2 or the device 4) informs the device 1 of service information of a group client(s) belonging to the group of the group owner. By doing so, efficiency of the service discovery process can be enhanced.

Yet, in the situation shown in FIG. 5, although service information of the devices belonging to the two P2P groups are obtainable, a separate one-to-one service discovery process should be performed for a device (e.g., the device 5) belonging to no P2P group.

In order to more improve efficiency of a service discovery process, the present invention proposes a new method for a device requesting a service discovery to secure not only service-related information of a different device belonging to a same group but also service information of a device belonging to a different group or a device belonging to no group.

Figure 6:
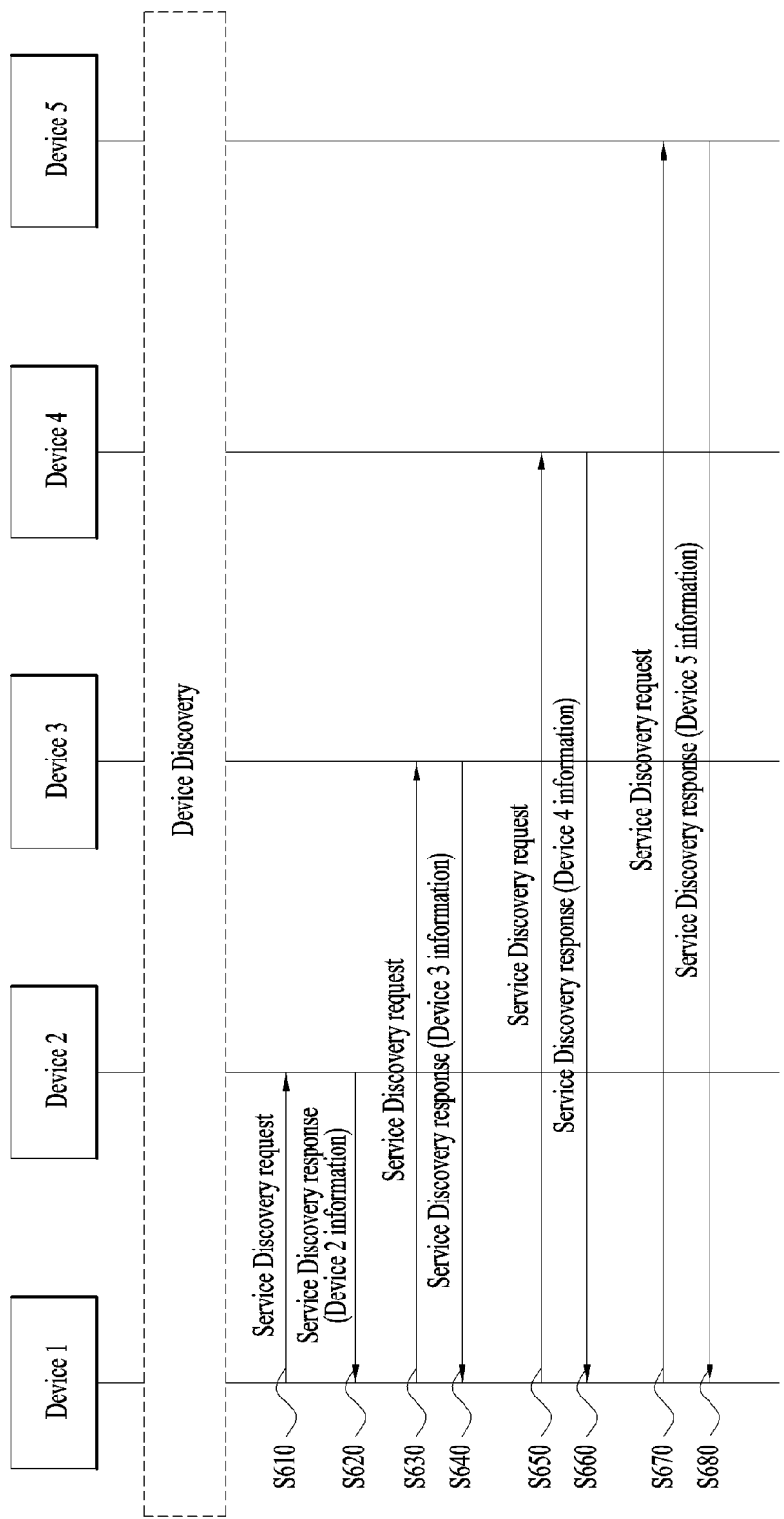
FIG. 6 is a flowchart for a service discovery process according to one example of a related art.

FIG. 6 is a flowchart for a service discovery process according to one example of a related art.

In an example of FIG. 6, a device discovery process may refer to what is mentioned earlier in FIG. 4. A device 1 is able to know whether each of different devices supports a service discovery operation during the device discovery process. Based on this, the device 1 can transmit and receive a service discovery request/response according to each device in accordance with a prescribed order.

Specifically, in the step S610, the device 1 transmits a service discovery request message to a device 2. In the step S620, the device 1 receives a service discovery response message from the device 2. By doing so, the device 1 can obtain service-related information of the device 2.

In the step S630, the device 1 transmits a service discovery request message to a device 3. In the step S640, the device 1 receives a service discovery response message from the device 3. By doing so, the device 1 can obtain service-related information of the device 3.

In the step S650, the device 1 transmits a service discovery request message to a device 4. In the step S660, the device 1 receives a service discovery response message from the device 4. By doing so, the device 1 can obtain service-related information of the device 4.

In the step S670, the device 1 transmits a service discovery request message to a device 5. In the step S680, the device 1 receives a service discovery response message from the device 5. By doing so, the device 1 can obtain service-related information of the device 5.

In particular, according to the example of FIG. 6, having received the service discovery request from the device 1, each device can transmit the service discovery response message including service-related information only of each device to the device 1. Hence, in order for the device 1 to obtain the service-related information of the device 2, 3, 4 and 5, the device 1 should sequentially perform the service discovery process 4 times.

Figure 7:
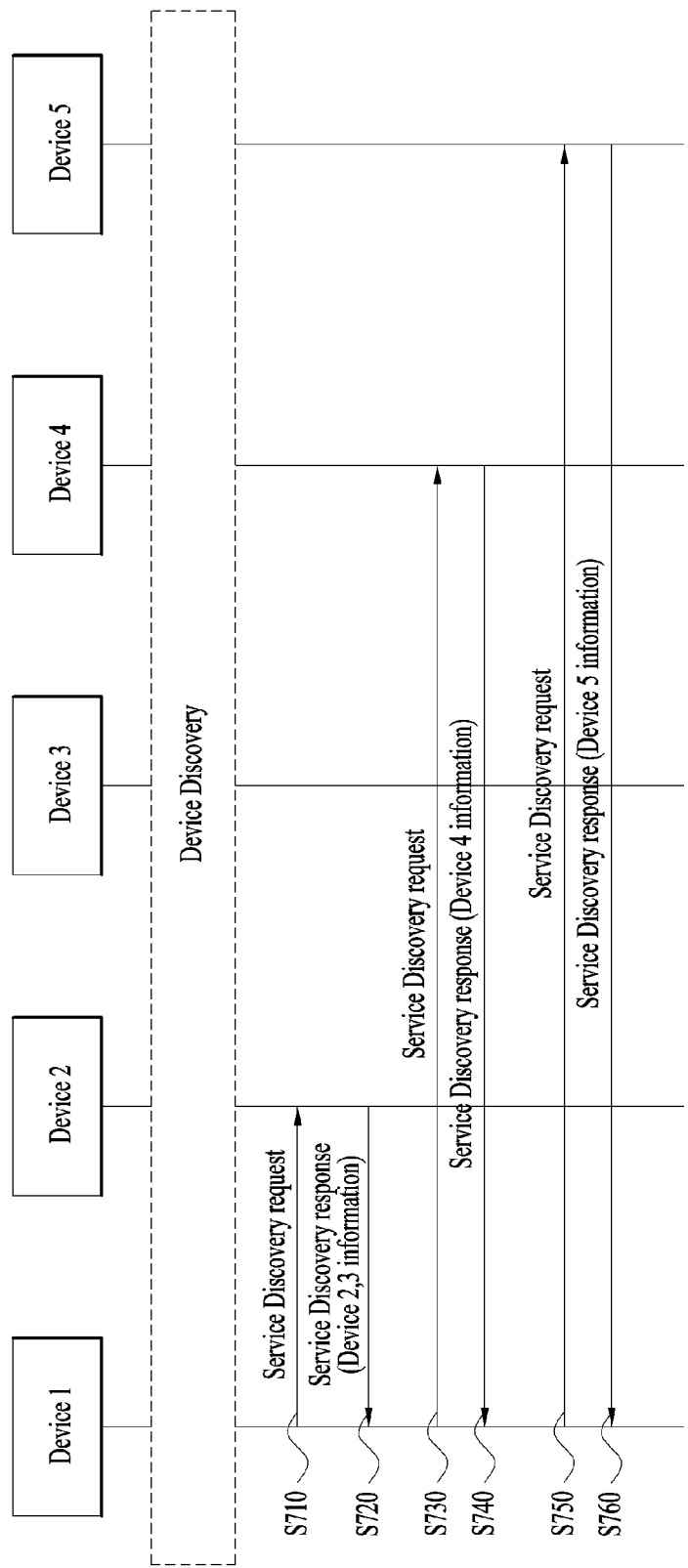
FIG. 7 is a flowchart for a service discovery process according to a different example of a related art.

FIG. 7 is a flowchart for a service discovery process according to a different example of a related art.

In an example of FIG. 7, a device discovery process may refer to what is mentioned earlier in FIG. 4.

In an example of FIG. 7, assume that a group owner is able to transmit service-related information of a group client(s).

Specifically, in the step S710, a device 1 transmits a service discovery request message to a device 2 corresponding to a group owner. In the step S720, the device 1 receives a service discovery response message from the device 2. By doing so, the device 1 can obtain service-related information of a device 3 corresponding to a group client together with service-related information of the device 2 corresponding to the group owner.

In the step S730, the device 1 transmits a service discovery request message to a device 4 corresponding to a group owner. In the step S740, the device 1 receives a service discovery response message from the device 4. By doing so, the device 1 can obtain service-related information of the device 3 corresponding to the group owner. In the example of FIG. 5, since a group client does not exist in a P2P group 2 where the device 4 corresponds to the group owner, the device 4 can respond the service-related information of the device 4 only.

In the step S750, the device 1 transmits a service discovery request message to a device 5. In the step S760, the device 1 receives a service discovery response message from the device 5. By doing so, the device 1 can obtain service-related information of the device 5. Since the device 5 does not belong to a group, the device 5 can respond the service-related information of the device 5 only.

In particular, according to the legacy scheme shown in the example of FIG. 7, having received the service discovery request from the device 1, if each device corresponds to a group owner, each device can transmit a service discovery response message including service information of a group client(s). Hence, in order for the device 1 to obtain the service-related information of the device 2, 3, 4 and 5, the device 1 should perform the service discovery process 3 times. Hence, compared to the example of FIG. 6, it is more efficient in that the service discovery process with the device 3 is omitted. Yet, since it is necessary to perform a separate service discovery process for the device 4 and 5, which do not belong to a same P2P group to which the device 2 is belong thereto, there still exists inefficiency.

Figure 8:
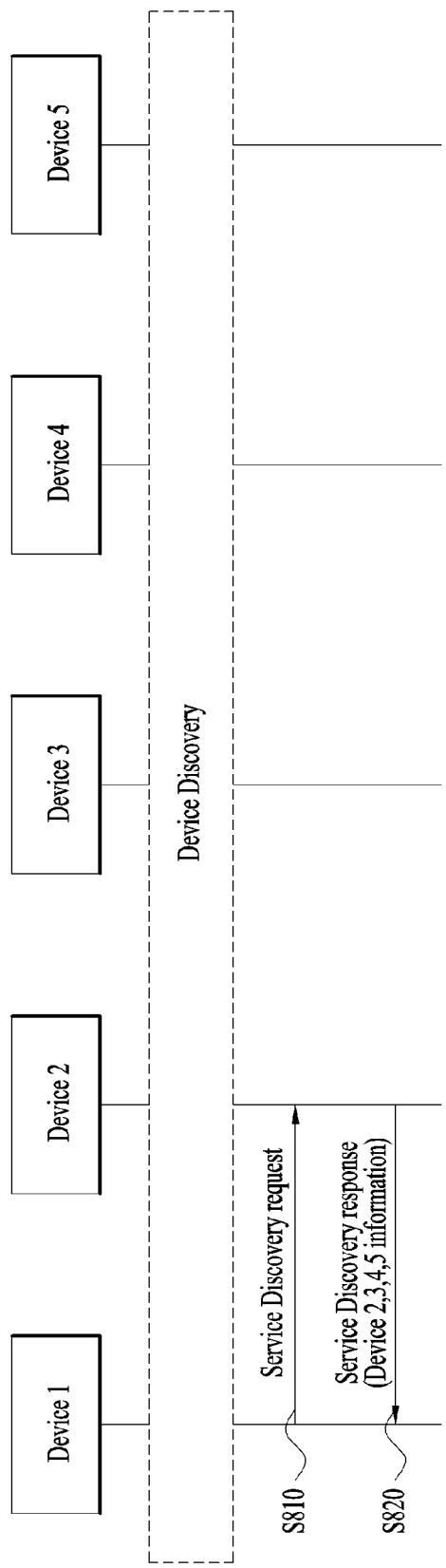
FIG. 8 is a flowchart for a service discovery process according to one example of the present invention.

FIG. 8 is a flowchart for a service discovery process according to one example of the present invention.

In an example of FIG. 8, a device discovery process may refer to what is mentioned earlier in FIG. 4.

In the step S810 of FIG. 8, a device 1 can transmit a service discovery request message to a device 2. In the step S820, the device 2 can transmit service-related information of the device 2 and service-related information of neighboring different devices (e.g., device 3, 4 and 5) to the device 1 in a manner of including the service-related information in a service discovery response message without a restriction that the device 2 should belong to a same group.

A scheme for the device 2 to obtain the service-related information of the device 3, 4 and 5 can be configured in various ways. For instance, a specific device can individually obtain service information of a different device using a GAS protocol, can obtain the service information in a manner of collecting service information of group clients of a different group from a group owner of the different group and can obtain the service-related information of different devices in various schemes.

Referring to the example of FIG. 8, it shows that the device 1 obtains the service-related information of different devices from the device 2, by which the present invention may be non-limited. The device 1 may transmit a service discovery request message to a random device (e.g., device 5) and the device 5 can transmit service-related information of the device 5 and service-related information of different devices (e.g., device 2, 3 and 4) to the device 1 via a service discovery response message in response to the service discovery request message.

Or, if the device 1 selects a specific device in the device discovery process and transmits a service discovery request message to the selected device, the selected device can transmit service-related information of the selected device and service-relation information of neighboring different devices to the device 1 via a service discovery response message.

For instance, a device capable of being consistently supplied by sufficient power, including an available space of a memory and operating in fixed environment can obtain and cache service-related information of different devices. For instance, a specific device periodically obtains and monitors service-related information of different devices and caches not modified (or static) service-related information among the service-related information of the different devices in a memory of the specific device. In terms of a device transmitting a service discovery request, if the device preferentially performs a service discovery process for the specific device, the device can promptly and efficiently obtain service-related information of many devices. Whether or not a device caches service-related information of different devices can be identified via device capability information and the like in a device discovery process (e.g., a probe request/response) and the like.

As shown in FIG. 8, if a service discovery process according to a proposal of the present invention is performed, since an individual service discovery process for the device 3, the device 4 and the device 5 can be omitted, time delay taken for the service discovery process can be reduced and efficiency of resource utilization of a wireless network can be enhanced.

FIG. 9 is a diagram for an exemplary format of ANQP vendor-specific element according to one example of the present invention.

In order for a device to discover and select an appropriate network before the device is connected with a network (or, before an STA establishes association with an AP), it may be able to use a scheme of advertising an access network type (e.g., a private network, a free public network, a charged public network and the like), a roaming agreement, location information and the like. And, it may be able to use a GAS (generic advertisement service) enabling an advertisement protocol frame (e.g., a second layer (layer 2) or a MAC frame) to be transceived between a server of a network and a device before the device is authenticated. According to the GAS scheme, an AP relays a query of an STA to a server (e.g., an advertisement server (AS)) of a network and the AP can play a role in delivering a response of the network server to the STA.

In order for an STA to obtain various information of a preferred network, it may be able to use an ANQP (access network query protocol). Specifically, it may be able to request information on an access network preferred by an STA in a manner of indicating the ANQP to a GAS query frame. By doing so, the STA can obtain network service information (e.g., service information provided by IBSS, local access service, available subscription service provider, external network information and the like) which is not provided by a beacon frame or a probe response frame.

An ANQP element is defined for a variety of information including a query list, a capability list and the like in advance. In order to support a query for information not defined in advance, it may be able to use a vendor-specific ANQP element.

As shown in FIG. 9, a vendor-specific ANQP element can basically include an information ID (Info ID), a length field, an OI (organization identifier) field and a vendor-specific content field.

The information ID field has a size of 2 octets and can be configured by a value indicating that a corresponding element is a vendor-specific ANQP element.

The length field has a size of 2 octets and can be configured by a value indicating a length of following fields.

The OI field has a variable length, which is not predetermined, and includes a unique identifier of a public organization allocated by IEEE.

The vendor-specific content field has a variable size and can include contents defined by an organization specified by a value of the OI field.

The exemplary ANQP element shown in FIG. 9 can include information on an ANQP query request/response and can be transmitted in a manner of being included in a query request/response field of a GAS request/response frame. A service discovery request/response frame proposed by the present invention can be configured using the GAS request/response frame. Hence, an ANQP element described in the following can be included in the service discovery request/response frame proposed by the present invention, by which the present invention may be non-limited. A scope of the present invention should be construed as the scope including a service discovery request/response message of various formats including information described in the following description.

FIG. 10 is a diagram for an exemplary format of ANQP query request vendor-specific content according to one example of the present invention.

Fields shown in FIG. 10 can be included in the vendor-specific content mentioned earlier in FIG. 9.

An OUI (organizationally unique identifier) subtype field has a size of 1 octet and can be configured by a value specifically specifying a vendor.

A service update indicator field has a size of 2 octets and is defined by a counter value respectively included in a service discovery request frame and a service discovery response frame. The counter corresponds to a value increasing whenever service information is changed in a device transmitting the service discovery request frame and the service discovery response frame. A specific device can cache service information of a different device using the service update indicator. For instance, when a service update indicator in a frame transmitted by a transmission device indicates update of service information, if a device receives the frame, the device flushes previously stored service information of the transmission device and may be then able to store new service information.

An ANQP query request vendor-specific content TLV (type-length-value) field can include a length field, a service protocol type field, a service transaction ID field and a query data field.

The length field has a size of 2 octets and can be configured by a value indicating a length of following fields.

The service protocol type field has a size of 1 octet and can be configured by a value indicating a protocol (e.g., Bonjour, UPnP, Wi-Fi display and the like) to be discovered.

Table 1 in the following shows an example of the service protocol type field.

TABLE 1

| Bit location | Usage |
| --- | --- |
| 0-6 | service protocol type or service protocol ID |
| 7 | request for cached service discovery |

Since the service protocol type field has a size of 1 octet, the service protocol type field has total 8 bits ranging from a $0^{th}$ bit location to a $7^{th}$ bit location. In this case, bit locations ranging from the $0^{th}$ bit location to $6^{th}$ bit location are used to indicate a specific type of a service protocol. For instance, if the bit locations ranging from the $0^{th}$ bit location to the $6^{th}$ bit location are set to 0, it may indicate all service protocols. If the bit locations set to 1, it indicates a Bonjour protocol. If the bit locations set to 2, it may indicate UPnP protocol. If the bit locations set to 3, it may indicate a Wi-Fi display. Hence, maximum 128 types of service protocols can be indicated using the bit locations ranging from the $0^{th}$ bit location and the $6^{th}$ bit location of the service protocol type field and remaining values not assigned to the service protocol among the 128 values can be reserved.

In addition, a $7^{th}$ bit location of the service protocol type field can be used to indicate whether service information of a responding device receiving a service discovery request is requested only or service information of neighboring different devices cached by the responding device as well as the service information of the responding device are requested. For instance, if the $7^{th}$ bit location of the service protocol type field is set to 0, it indicates that the service information of the responding device receiving a service discovery request is requested only. If the $7^{th}$ bit location of the service protocol type field is set to 1, it indicates that the service information of the neighboring device cached by the responding device is requested as well as the service information of the responding device.

The service transaction ID field of FIG. 10 has a size of 1 octet and can be configured by a random value, which is not 0, when a service discovery request frame is generated.

The query data field has a variable size and includes a structure of a service discovery request frame and content definition.

FIG. 11 is a diagram for an exemplary format of ANQP query response vendor-specific content according to one example of the present invention.

Fields shown in FIG. 11 can be included in the vendor-specific content mentioned earlier in FIG. 9.

Explanation on an OUI field and a service update indicator field of FIG. 11 may refer to what is mentioned earlier in FIG. 10.

Among the fields of the ANQP query response vendor-specific content TLV field, a length field is configured by a value indicating a length of following fields.

A service protocol type field can be configured as shown in FIG. 11, can be used to indicate a service protocol to be supported, and a $7^{th}$ bit location can be used to indicate whether to provide cached service information of different devices.

A value of a service transaction ID field is configured to be identical to a value of a service transaction ID field of a service discovery request frame. Hence, the value of the service transaction ID field can indicate a service discovery response corresponding to a service discovery request.

A status code field can be configured as shown in Table 2 in the following.

TABLE 2

| Value | Meaning |
|---|---|
| 0 | success |
| 1 | service protocol type not available |
| 2 | Requested information not available |
| 3 | bad request |
| 4-255 | reserved |

The status code field indicates status information on a service requested by a service discovery request frame. For instance, if a value of the status code corresponds to 0, it indicates that a requested service protocol is available. If the value of the status code corresponds to 1, it indicates that a requested protocol is unavailable. If the value of the status code corresponds to 2, it indicates that requested information is unavailable. If the value of the status code corresponds to 3, it indicates that a request is wrong. The remaining status code is currently not defined and reserved.

A response data group field of FIG. 11 is explained with reference to FIG. 12 in the following.

FIG. 12 is a diagram for an example of a format of a response data group field according to one example of the present invention.

The response data group field of FIG. 11 can include a device identification information (device ID) field and a response data field.

The device ID field includes an attribute ID subfield, a length subfield, and a device address subfield. The attribute ID subfield has a size of 1 octet and can be configured by a value indicating an attribute of a P2P network. The length subfield has a size of 2 octets and can be configured by a value indicating a length of following fields. The device address subfield has a size of 6 octets and can be configured by a value indicating a MAC address of a device.

The response data field may vary according to a service protocol type field of a service discovery request frame and a service information type included in a query data field. In particular, a service protocol type requested by the service discovery request frame and service information related to the service protocol type can be included in the response data field. For instance, in case of querying whether the service discovery request frame supports a specific service protocol, the response data field can include additional information such as version information of a protocol, detail service information and the like together with information on whether to support the specific service protocol.

The response data group field of FIG. 11 can include one or more pairs of the device identification information field and the response data field of FIG. 12. For instance, in case of responding in response to service information supported by a device, as shown in FIG. 12, one device identification information field and one response data field can be included in the response data group field of FIG. 11. Yet, according to what is proposed by the present invention, a specific device (e.g., a device 2 in the example of FIG. 8) can inform a requesting device (e.g., a device 1) of service information of different devices (e.g., device 3, 4 and 5) as well as service information of the specific device. In this case, the response data group field of FIG. 11 can include a plurality of pairs of the device identification information field and the response data field.

FIG. 13 is a diagram for a different example of a format of a response data group field according to one example of the present invention.

As shown in FIG. 13, a responding device (e.g., a device 2) generates a service discovery response frame including device identification information on each of different devices (e.g., a device 3, 4 and 5) and a response data field in addition to device identification information field of the responding device and a response data field and may be able to transmit the service discovery response frame, the device identification information field and the response data field to a requesting device (e.g., a device 1). The response data field, which forms a pair with each device identification information field, can include information on whether a requested service is supported by a corresponding device, a version of the service and the like.

Although an example of FIG. 13 shows that the device 2 configures a service discovery response frame in a manner of simply collecting and listing service information of neighboring different devices, according to an additional example of the present invention, in case of responding in response to service information of a plurality of devices, if there exist a plurality of service types supported according to each of a plurality of the devices, as shown in FIG. 13, response data can be configured according to a service type capable of being provided.

For instance, assume that the device 2 supports a service 1 and a service 2, the device 3 supports the service 1 and the service 2, the device 4 supports the service 2 and a service 3, and the device 5 supports the service 3. In this case, a service discovery response frame transmitted by the device 2 in response to a service discovery request of the device 1 includes device identification information on the device 2 and a response data and device identification information on the device 3 and a response data for the service 1, includes device identification information on the device 2 and a response data, device identification information on the device 3 and a response data and device identification information on the device 4 and a response data for the service 2, and includes device identification information on the device 4 and a response data and device identification information on the device 5 and a response data for the service 3.

Meanwhile, as mentioned in the foregoing description, unlike a legacy service discovery process (e.g., one-to-one service discovery process or a service discovery process for a group owner), when a specific device provides service information of neighboring different devices without a restriction of a group, it may be able to newly define a device having capability of supporting the enhanced service discovery process.

Table 3 in the following shows a modified P2P capability bitmap according to an example of the present invention.

TABLE 3

| Bit | Information |
| --- | --- |
| 0 | Service Discovery |
| 1 | P2P Client Discoverability |
| 2 | Concurrent Operation |
| 3 | P2P Infrastructure Managed |
| 4 | P2P Device Limit |
| 5 | P2P Invitation Procedure |
| 6 | Cached Service Discovery |
| 7 | Reserved |

In a legacy P2P capability bitmap, bit 0 to bit 5 are defined in a manner of being identical to Table 3 and bit 6 and 7 are defined as reserved bits. The present invention proposes to use one of the reserved bits as a bit indicating whether a service discovery process proposed by the present invention is supported. For instance, a bit 6 of a capability bitmap can be defined and used as a bit indicating whether a cached service discovery operation (or extended service discovery operation) is supported.

For instance, if a value of a cached service discovery bit corresponds to 1, it may indicate a device supporting the service discovery operation (i.e., responding device caches service information of a neighboring different device and transmits the service information to a requesting device via a service discovery response frame) proposed by the present invention. If the value corresponds to 0, it may indicate a device not supporting the service discovery operation proposed by the present invention.

As shown in Table 3, a device capability bitmap field of a P2P capability attribute can be transmitted via a beacon frame, a probe response frame, an associated frame, a re-associated frame or the like. For instance, a requesting device can identify a device supporting an extended service discovery operation proposed by the present invention via a device discovery process, transmit a service discovery request frame in a manner of selecting the device and may be able to request to provide service information of a different device(s) cached in the service discovery request frame (refer to Table 1). A responding device, which receives the service discovery request frame, can transmit a service discovery response frame including service-related information of one or more devices to the requesting device.

Although the methods explained in the aforementioned various examples of the present invention are represented as a series of operations for clarity, an order of performing the steps may be non-limited by the methods. If necessary, each of the steps can be performed at the same time or can be performed by an order different from each other. And, it is not mandatory to have all steps to implement the method proposed by the present invention.

In the aforementioned method of the present invention, items mentioned earlier in various embodiments of the present invention can be independently applied or two or more embodiments can be applied at the same time.

Figure 14:
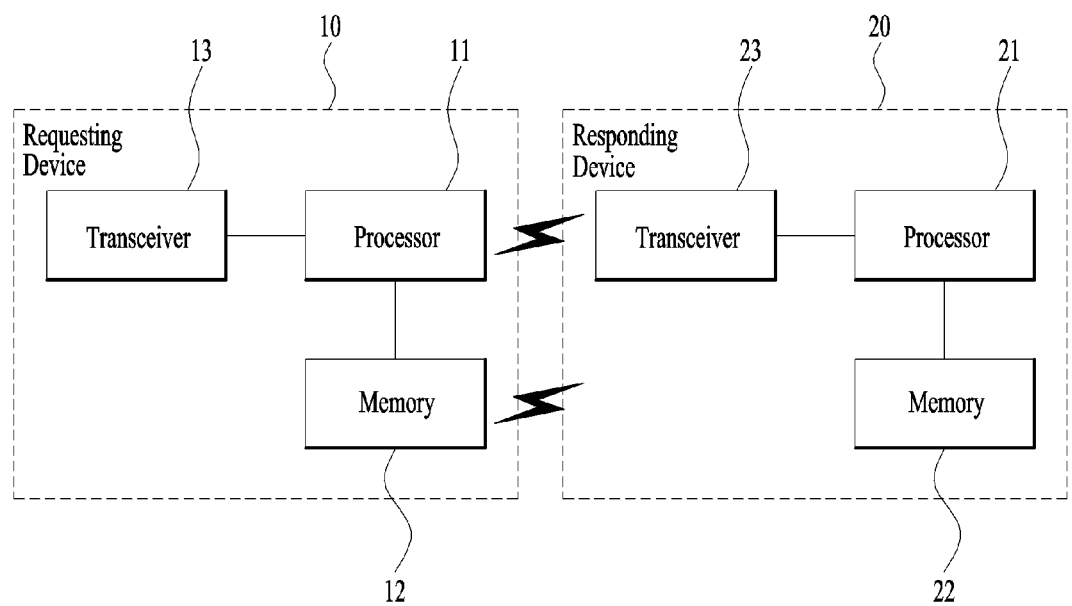
FIG. 14 is a block diagram for a configuration of a wireless device according to one embodiment of the present invention.

FIG. 14 is a block diagram for a configuration of a wireless device according to one embodiment of the present invention.

A requesting device 10 can include a processor 11, a memory 12 and a transceiver 13. A responding device 20 can include a processor 21, a memory 22 and a transceiver 23. The transceiver 13/23 can transmit and receive a radio signal. For instance, the transceiver can implement a physical layer according to IEEE 802 system. The processor 11/21 can implement a physical layer and/or a MAC layer according to IEEE 802 system in a manner of being connected with the transceiver 13/21. The processor 11/21 can be configured to perform an operation according to the aforementioned various embodiments of the present invention. And, a module configured to implement an operation of a device according to the aforementioned various embodiments of the present invention is stored in the memory 12/22 and the module can be executed by the processor 11/21. The memory 12/22 is included in the internal of the processor 11/21 or is installed in the external of the processor 11/21 and can be connected with the processor 11/21 by a medium well-known to the public.

The processor 11 of the requesting device 10 can be configured to transmit a service discovery request frame to the responding device 20 using the transceiver 13. And, the processor 11 can be configured to receive a service discovery response frame including service information of the responding device 20 and service information of each of one or more different devices from the responding device 20 using the transceiver 13.

The processor 21 of the responding device 20 can be configured to receive a service discovery request frame from the requesting device 20 using the transceiver 23. And, the processor 21 can be configured to transmit a service discovery response frame including service information of the responding device 20 and service information of each of one or more different devices to the requesting device 10 using the transceiver 23.

In this case, the one or more different devices may include a device not belonging to a group to which the responding device is belonging thereto. And, the service discovery request frame and the service discovery response frame can be configured according to the items mentioned earlier in various embodiments of the present invention.

A detail configuration of the requesting device and the responding device can be implemented in a manner of independently applying the items mentioned earlier in the various embodiments of the present invention or applying two or more embodiments at the same time. For clarity, explanation on overlapped contents is omitted at this time.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Although the aforementioned various embodiments of the present invention are described centering on examples applied to IEEE 802.11 system, it may be applicable to various kinds of mobile communication systems using an identical scheme.

What is claimed is:

1. A method of performing a service discovery process in a wireless LAN system, the method comprising:
   transmitting, by a requesting device, a service discovery request frame to a group owner device, the service discovery request frame including a service protocol type field with a specific bit that indicates whether a cached service discovery is requested,
   wherein the requesting device and the group owner device are included in a group of devices established by the requesting device and the group owner device, and
   wherein the group owner device controls the group and identifies first service information of devices included in the group; and
   receiving, by the requesting device, a service discovery response frame from the group owner device, the service discovery response frame including the first service information and second service information of the group owner device,
   wherein the service discovery response frame further includes service information of devices not included in the group when the cached service discovery is requested.

2. The method of claim 1, wherein the group owner device corresponds to a device selected by a device discovery process performed by the requesting device.

3. The method of claim 1, wherein the group owner device corresponds to a device having capability for caching the service information of each of one or more different devices.

4. The method of claim 3, wherein information indicating the capability of the group owner device is included in at least a beacon frame, a probe response frame, an associated frame or a re-associated frame that are transmitted by the responding device.

5. The method of claim 3, wherein information indicating the capability of the group owner device is configured by a bitmap comprising a bit indicating whether the group owner device supports the cached service discovery.

6. The method of claim 1, wherein the service discovery response frame further includes device identification information of each of the devices included in the group and device identification information of one or more different devices.

7. The method of claim 1, wherein the service discovery response frame further includes device identification information and service information supported by each of a plurality of service types if the plurality of service types are supported by both the group owner device and one or more different devices.

8. The method of claim 1, wherein the service discovery process is performed before the requesting device is connected to a network.

9. The method of claim 1, wherein the group corresponds to a Wi-Fi direct group.

10. A method of performing a service discovery process in a wireless LAN system, the method comprising:
    receiving, by a group owner device, a service discovery request frame from a requesting device, the service discovery request frame including a service protocol type field with a specific bit that indicates whether a cached service discovery is requested,
    wherein the requesting device and the group owner device are included in a group of devices established by the requesting device and the group owner device, and
    wherein the group owner device controls the group and identifies first service information of devices included in the group; and
    transmitting, by the group owner device, a service discovery response frame to the group owner device, the service discovery response frame including the first service information and second service information of the group owner device,
    wherein the service discovery response frame further includes service information of devices not included in the group when the cached service discovery is requested.

11. A requesting device performing a service discovery process in a wireless LAN system, the device comprising:
    a transceiver configured to transmit and receive information; and
    a processor configured to:
    control the transceiver to transmit a service discovery request frame to a group owner device, the service discovery request frame including a service protocol type field with a specific bit that indicates whether a cached service discovery is requested,
    wherein the requesting device and the group owner device are included in a group of devices established by the requesting device and the group owner device, and
    wherein the group owner device controls the group and identifies first service information of devices included in the group; and control the transceiver to receive a service discovery response frame from the group owner device, the service discovery response frame including the first service information and second service information of the group owner device, wherein the service discovery response frame further includes service information of devices not included in the group when the cached service discovery is requested.

12. A group owner device performing a service discovery process in a wireless LAN system, the device comprising:

a transceiver configured to transmit and receive information; and a processor configured to:

control the transceiver to receive a service discovery request frame from a requesting device, the service discovery request frame including a service protocol type field with a specific bit that indicates whether a cached service discovery is requested, wherein the requesting device and the group owner device are included in a group of devices established by the requesting device and the group owner device, and wherein the group owner device controls the group and identifies first service information of devices included in the group; and control the transceiver to transmit a service discovery response frame to the group owner device, the service discovery response frame including the first service information and second service information of the group owner device, wherein the service discovery response frame further includes service information of devices not included in the group when the cached service discovery is requested.

13. The method of claim 10, wherein the service discovery response frame further includes device identification information of each of the devices included in the group and device identification information of one or more different devices.

14. The method of claim 10, wherein the service discovery response frame further includes device identification information and service information supported by each of a plurality of service types if the plurality of service types are supported by both the group owner device and one or more different devices.

15. The method of claim 11, wherein the service discovery response frame further includes device identification information of each of the devices included in the group and device identification information of one or more different devices.

16. The method of claim 11, wherein the service discovery response frame further includes device identification information and service information supported by each of a plurality of service types if the plurality of service types are supported by both the group owner device and one or more different devices.

17. The method of claim 12, wherein the service discovery response frame further includes device identification information of each of the devices included in the group and device identification information of one or more different devices.

18. The method of claim 12, wherein the service discovery response frame further includes device identification information and service information supported by each of a plurality of service types if the plurality of service types are supported by both the group owner device and one or more different devices.

* * * * *